United States Patent Office 2,747,985
Patented May 29, 1956

2,747,985

METHODS OF PRODUCING COMMERCIALLY PURE IRON

Vincenzo Stefano Arata, Rome, Italy

No Drawing. Application May 5, 1952,
Serial No. 286,213

7 Claims. (Cl. 75—11)

The present invention relates to an industrial process for producing pure iron.

Considerable difficulty has been experienced in producing commercially pure iron at low cost and with a minimum carbon content and it is the primary object of the present invention to provide a novel, low cost, industrial method of producing commercially pure iron with an extremely low carbon content.

In present methods of iron production, it is customary to first convert the iron ore into pig iron containing considerable amounts of impurities, which pig iron may be further treated by a Bessemer process or by an open hearth procedure to transform it into iron or steel, which still is not sufficiently pure for many industrial purposes.

It is therefore a primary object of the present invention to produce industrially pure iron substantially devoid of carbon, silicon, phosphorous, manganese and sulphur, in one step directly from iron ore without blast furnace, Bessemer process or open hearth operations.

Another object is to provide an ore-direct process for manufacturing commercially pure iron, that is, iron with an extremely low content of carbon, silicon, sulphur, manganese and phosphorus, which can be carried out with such equipment as can be handled by available labor without requiring new skills or additional training, starting from standard and readily available iron ores and other raw materials, such as limestone, charcoal, and fluorspar.

In the usual process for producing iron (e. g. blast furnace), it is customary to provide an excess of carbon in the form of coke to create a reducing environment. The process according to the invention makes use of the fact that substantially pure iron may be produced in an oxidizing rather than a reducing environment, namely by using a smaller amount of carbon than is required to reduce completely the iron oxide serving as the iron raw material.

Heretofore, highly pure iron could be produced in sponge or in finely divided powdered form only, and a subsequent smelting operation was necessary to agglomerate it; this operation led to the re-introduction of impurities into the iron mass.

It is among the further objects of the present invention to provide a process for producing pure iron in which this final smelting operation is avoided and in which the pure iron is obtained directly in liquid form ready for casting into ingots or moulds.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

According to the present invention, it has been found possible to produce a pure iron directly from iron ore by the use of finely divided charcoal rather than coke in quantities insufficient to reduce all of the oxygen present in the iron ore and thus to provide an oxidizing environment.

The iron ore in the form of ground iron oxide, and preferably of finely divided magnetite, is mixed with finely comminuted charcoal, with limestone and possibly with smaller amounts of other ingredients such as iron produced in previous batches.

This mixture is charged into an electric furnace and the slag is removed together with all of the impurities. The process is continuous, with frequent removal of slag and further additions of limestone, fluorspar and also pulverized magnetite.

Tests must be conducted at various times for various impurities, such as carbon and sulphur, and at all times it should be certain that the final product contains much less than 0.1% of total impurities including carbon, sulphur, phosphorous, silicon and manganese.

As a final test, the molten iron is poured upon a steel plate and if there is only slight adhesion, the molten batch is ready for casting.

To obtain killed ingots, it is not necessary to add either ferro-silicon or ferro-manganese to the batch. For this purpose, one may simply add before casting small quantities of aluminum or of ferro-titanium, for example three parts per thousand.

"Effervescent" iron is obtained by casting at a higher temperature with the addition of ½ part per thousand of aluminum in the furnace.

All forging and laminating of the final product should be carried out above 1200° C. or below 820° C., since between 820° C. and 1200° C. the final product shows a tendency to be brittle.

At the end of the smelting operation when the metal bath contains only small quantities of carbon and oxygen and consists substantially of pure, molten iron, instead of adding to the bath manganese, silicon or any other known oxygen-removers to the bath which would remove the residual oxygen and leave the carbon, in this invention small additional quantities of iron oxide or iron ore are added; at this critical temperature of about 1500° C. to 1600° C., iron oxide will react with the residual carbon to remove it as carbon monoxide. Any excess iron oxide will not contaminate the metal bath, but will rather be removed with the slag.

It has been found that under these conditions, namely, when the iron is very pure, the metal bath will not take up oxygen and therefore will not become more effervescent owing to the formation of gases resulting from taking up of oxygen. It is therefore not necessary to use especially powerful procedures to kill the bath.

An important feature of the present invention is that any titanium present is eliminated in the slag.

*Example I*

As a specific example, an electric furnace charge is made up of the following materials:

| | Preferred | Range |
|---|---|---|
| Finely ground magnetite | 5,000 | 2,000–7,000 |
| Finely ground wood charcoal | 1,500 | 500–2,500 |
| Carbon electrode chips | 200 | 0–500 |
| Scrap-pure iron chips | 200 | 20–500 |
| Limestone in small lumps | 600 | 300–1,000 | all parts being by weight.

An electric furnace is used having vertical electrodes and a lining of magnesite or dolomite, or some other suitable basic lining.

Preferably the charge is covered with a layer of pulverized magnetite and then a layer of the iron chips mentioned above is supplied around the electrodes to facilitate the starting of the arc.

After starting, the electric furnace is initially operated with a low voltage of 110 volts and this low voltage is maintained to give maximum amperage.

When the charge has been reduced to liquid form, the lining is scraped and finally, when the batch is completely molten, small quantites of limestone may be placed adjacent the lining of the furnace to protect it against corrosion through the acid reaction of the slag.

The slag is removed by tilting the furnace and the removal of slag may be assisted by a mechanical rake.

A sample of the molten iron batch is then tested for carbon and sulphur. If upon this test the carbon or sulphur is in excess of 0.06% the proper proportions for subsequent initial charges made of the same ingredients are revised so that at the first melt on the next heat a carbon content of 0.06% will be achieved. With any initial charge unless the carbon content on first test is as low as 0.02% it is then desirable to introduce about 100 to 125 parts of limestone and about 50 parts of fluorspar to fuse the slag, and to add additional quantities, for example 50 to 150 parts of magnetite to reduce the carbon content of the molten iron.

The addition of pulverized magnetite may be continued until a test sample removed from the bath after solidification can be bent through 180° without cracking and will show silvery edges.

The addition of magnetite to the bath will reduce its carbon content and enable the production of an almost non-bubbling molten iron.

The final iron which is produced is of very high purity and has an extremely low carbon content of .02 percent.

*Example II*

In this procedure magnetite in powdered form is thoroughly mixed with about ¼ to ½ of its weight of charcoal and with limestone in an amount of 10 percent by weight of the iron ore.

Small quantities, say about 1 to 5 percent, of electrode graphite may also be added.

This mixture is introduced into an electric furnace with electrodes mounted vertically at the top thereof.

The furnace is provided with a basic lining and before charging the furnace, the hearth and walls of the furnace may be lined with limestone and quick-lime.

Desirably, the pure iron scrap from previous batches may be introduced into the furnace before the charge. Desirably the charge, after having been placed into the furnace, is covered with a layer of one or two inches of pulverized magnetite and this layer is covered with a layer of pure iron chips or turnings.

An initial voltage of 110 volts is used and it is desirable to maintain this low voltage to obtain maximum amperage.

Any aggregates which adhere to the walls of the furnace should be removed during the melting operation.

When the entire batch has become liquid, a small quantity of limestone may be placed against the wall lining. All slag should then be removed and the batch checked to make sure that the carbon and sulphur contents are both below .06 percent.

During the melting operation, additional limestone may be added, not to exceed about 2 percent of the weight of the ore and similar amounts of quick-lime and magnetite may also be added.

The addition of limestone and magnetite should be continued and the slag continuously removed until the test samples not only can be bent 180 degrees without cracking but also show a silvery color at the edges.

In a final stage, after removal of slag, an additional amount of quick-lime may be added, equivalent to .01 percent of the weight of the ore. The most convenient temperature for casting is reached when a test sample poured upon a steel plate presents a slight adherence.

In casting the batch, the ladles should be very hot and the diameter of the apertures of the ladles should be wider than 1.5". The test sample should shrink with slight effervescence and the batch is killed by adding, before casting, 3 parts per thousand of pure aluminum or 1½ parts per thousand of aluminum and 3 parts per thousand of titanium iron of low carbon content.

This addition should be made while the liquid is in the ladle and the aluminum must be prevented from rising to the surface.

The killed iron then may be cast in earthen molds or in ingot molds lined with asbestos, so as to avoid microscopic fissures in the ingots.

To obtain an "effervescent" iron, immediately before casting there is added to the molten batch about 0.5 part per thousand of aluminum and the casting is then carried out at a high temperature in ingot molds provided with plugs, with the addition of mill scale or aluminum chips, depending upon whether the iron is excessively killed or excessively effervescent.

Iron of the high purity obtained in this process is brittle in a critical range between 820° and 1200° C.

Therefore, the forging and laminating should be carried out above 1200° C. for "effervescent" iron and below 820° C. for killed iron. The "effervescent" iron should be laminated at about 1300° C. until the ingot is completely compacted. Afterwards it can be worked below 820° C.

In contrast to methods which obtain sponge iron, the process according to the invention produces molten iron which may be cast and handled by standard iron procedures without requiring subsequent smelting as is the case with sponge iron.

It is important that charcoal be used as a reducing agent for the iron oxide rather than other forms of carbon, such as coke.

An important feature of the present invention resides in the reduction of iron oxide to pure iron in one step by wood charcoal.

The amount of charcoal charged is less than that which is necessary to reduce the iron oxide completely; the excess iron oxide will be removed with the slag.

During the process the composition of the molten batch is always kept on the oxidizing side, as for example by addition of iron oxide, with the excess iron oxide being removed with the slag.

A further important feature of the present invention is that the molten iron is killed almost completely without the usual addition of ferro-silicon, ferro-manganese, or similar additions.

By the term "kill" is meant the complete elimination of gas which might tend to form pores or bubbles in the ingot.

By the term "pure iron" is meant an iron having a total content of less than 0.1% of the elements carbon, silicon, manganese, phosphorous, and sulphur.

By the term "oxidizing environment" is meant that the proportion of carbon in the form of charcoal is insufficient to combine with all the oxygen in the iron oxide of the ore. In some instances, the amount of carbon may be 10 to 30% less than the equi-molar to the oxygen of the ore, taking the mechanical and combustion losses in the furnace into account.

The embodiment of the invention described herein is to be considered merely as illustrative, as the invention is susceptible to variations, modifications and change within the spirit and scope of the appended claims.

Having now particularly described and ascertained the nature of the invention, and in what manner the same is to be performed, what is claimed is:

1. An industrial process for producing iron of high purity, namely, iron having a total content of the elements C, S, Mn, Si, and P not exceeding 0.1%, in a single operation from ferriferous oxides, which comprises: preparing an intimate, non-agglomerated mixture of finely comminuted ferriferous oxide, finely comminuted charcoal and a calcareous flux in small lumps in such proportions that said charcoal be, taking into account mechanical and combustion losses involved in the successive operation of the furnace, insufficient to reduce all of the iron contained in said ferriferous oxide and that the molten iron produced when said mixture is initially melted during said process shall contain substantially .06% carbon; charging said mixture into a furnace having neither an oxidizing nor a reducing action; supplying to all or parts of said mixture sufficient heat to start and maintain the reduction process and to melt, after said reduction has taken place, the resulting content of said furnace; removing the slag; ascertaining that neither the carbon nor the sulphur content of the molten bath exceeds 0.06%; forming a new slag by charging limestone (CaCO3) and a small amount of ferriferous oxide; extracting a metal sample and checking whether it exhibits the prerequisite features; and tapping the iron if said prerequisite features have been attained or continuing, if this is not the case, alternatingly to form and remove new slag and to check the features of samples until these correspond to said prerequisites, and then removing the slag and tapping the iron.

2. An industrial process for producing iron of high purity, namely, iron having a total content of the elements C, S, Mn, Si and P not exceeding 0.1%, in a single operation from ferriferous oxides, which comprises: preparing an intimate, non-agglomerated mixture of finely comminuted ferriferous oxide, finely comminuted charcoal and a calcareous flux in small lumps in such proportions that said charcoal be, taking into account mechanical and combustion losses involved in the successive operation of the furnace, insufficient to reduce all of the iron contained in said ferriferous oxide and that the molten iron produced when said mixture is initially melted during said process shall contain substantially .06% carbon; charging said mixture into an electric furnace with basic lining having neither an oxidizing nor a reducing action; supplying to all or parts of said mixture sufficient heat to start and maintain the reduction process and to melt, after said reduction has taken place, the resulting content of said furnace; removing the slag; ascertaining that neither the carbon nor the sulphur content of the molten bath exceeds 0.06%; forming a new slag by charging limestone (CaCO3) and a small amount of ferriferous oxide; extracting a metal sample and checking whether it exhibits the prerequisite features; and tapping the iron if said prerequisite features have been attained or continuing, if this is not the case, alternately to form and remove new slag and to check the features of samples until these correspond to said prerequisites, and then removing the slag and tapping the iron.

3. An industrial process for producing iron of high purity, namely, iron having a total content of the elements C, S, Mn, Si and P not exceeding 0.1%, in a single operation from ferriferous oxides, which comprises: preparing an intimate, non-agglomerated mixture of finely comminuted ferriferous oxide, finely comminuted charcoal and limestone (CaCo3) in small lumps in such proportions that said characoal be, taking into account mechanical and combustion losses involved in the successive operation of the furnace, insufficient to reduce all of the iron contained in said ferriferous oxide and that the molten iron produced when said mixture is initially melted during said process shall contain substantially .06% carbon; charging said mixture into a furnace having neither an oxidizing nor a reducing action; supplying to all or parts of said mixture sufficient heat to start and maintain the reduction process and to melt, after said reduction has taken place, the resulting content of said furnace; removing the slag; ascertaining that neither the carbon nor the sulphur content of the molten bath exceeds 0.06%; forming a new slag by charging limestone (CaCO3) and a small amount of ferriferous oxide; extracting a metal sample and checking whether it exhibits the prerequisite features; and tapping the iron if said prerequisite features have been attained or continuing, if this is not the case, alternatingly to form and remove new slag and to check the features of samples until these correspond to said prerequisites, and then removing the slag and tapping the iron.

4. An industrial process for producing iron of high purity, namely, iron having a total content of the elements C, S, Mn, Si and P not exceeding 0.1%, in a single operation from ferriferous oxides, which comprises: preparing an intimate, non-agglomerated mixture of finely comminuted ferriferous oxide, finely comminuted charcoal and a calcareous flux in small lumps in such proportions that said charcoal be, taking into account mechanical and combustion losses involved in the successive operation of the furnace, insufficient to reduce all of the iron contained in said ferriferous oxide and that the molten iron produced when said mixture is initially melted during said process shall contain substantially .06% carbon; charging said mixture into a furnace having neither an oxidizing nor a reducing action; supplying to all or parts of said mixture sufficient heat to start and maintain the reduction process and to melt, after said reduction has taken place, the resulting content of said furnace; removing the slag; ascertaining that neither the carbon nor the sulphur content of the molten bath exceeds 0.06%; forming a new slag by charging limestone (CaCO3) and a small amount of ferriferous oxide; extracting a metal sample and checking whether it exhibits the prerequisite features; and adding quick lime (CaO) and tapping the iron if said prerequisite features have been attained or continuing, if this is not the case, alternatingly to form and remove new slag and to check the features of samples until these correspond to said prerequisites, and then removing the slag, adding quick lime (CaO) and tapping the iron.

5. An industrial process for producing killed iron of high purity, namely, iron having a total content of the elements C, S, Mn, Si and P not exceeding 0.1%, in a single operation from ferriferous oxides, which comprises: preparing an intimate, non-agglomerated mixture of finely comminuted ferriferous oxide, finely comminuted charcoal and a calcareous flux in small lumps in such proportions that said charcoal be, taking into account mechanical and combustion losses involved in the successive operation of the furnace, insufficient to reduce all of the iron contained in said ferriferous oxide and that the molten iron produced when said mixture is initially melted during said process shall contain substantially .06% carbon; charging said mixture into a furnace having neither an oxidizing nor a reducing action; supplying to all or parts of said mixture sufficient heat to start and maintain the reduction process and to melt, after said reduction has taken place, the resulting content of said furnace; removing the slag; ascertaining that neither the carbon nor the sulphur content of the molten bath exceeds 0.06%; forming a new slag by charging limestone (CaCO3) and a small amount of ferriferous oxide; extracting a metal sample and checking whether it exhibits the prerequisite features; and tapping the iron if said prerequisite features have been attained or continuing, if this is not the case, alternatingly to form and remove new slag and to check the features of samples until these correspond to said prerequisites, and then removing the slag, adding quick lime (CaO) and tapping the iron, introducing in any case from 0.2 to 0.3% of pure solid aluminum into the ladle.

6. An industrial process for producing iron of high purity, namely, iron having a total content of the elements C, S, Mn, Si and P not exceeding 0.1%, in a single operation from ferriferous oxides, which comprises: preparing an intimate, non-agglomerated mixture of ferriferous oxide comminuted to pieces not exceeding pea-size, finely comminuted charcoal and a calcareous flux in small lumps in such proportions that said charcoal be, taking into account mechanical and combustion losses involved in the successive operation of the furnace, insufficient to reduce all of the iron contained in said ferriferous oxide and that the molten iron produced when said mixture is initially melted during said process shall contain substantially .06% carbon; charging said mixture into a furnace having neither an oxidizing nor a reducing action; supplying to all or parts of said mixture sufficient heat to start and maintain the reduction process and to melt, after said reduction has taken place, the resulting content of said furnace; removing the slag; ascertaining that neither the carbon nor the sulphur content of the molten bath exceeds 0.06%; forming a new slag by charging limestone ($CaCO_3$) and a small amount of ferriferous oxide; extracting a metal sample and checking whether it exhibits the prerequisite features; and tapping the iron if said prerequisite features have been attained or continuing, if this is not the case, alternatingly to form and remove new slag and to check the features of samples until these correspond to said prerequisites, and then removing the slag and tapping the iron.

7. An industrial process for producing iron of high purity, namely, iron having a total content of the elements C, S, Mn, Si, and P not exceeding 0.1%, in a single operation from ferriferous oxides, which comprises: preparing an intimate, non-agglomerated mixture of finely comminuted ferriferous oxide, charcoal comminuted to pieces not exceeding pea-size, and a calcareous flux in small lumps in such proportions that said charcoal be, taking into account mechanical and combustion losses involved in the successive operation of the furnace, insufficient to reduce all of the iron contained in said ferriferous oxide and that the molten iron produced when said mixture is initially melted during said process shall contain substantially .06% carbon; charging said mixture into a furnace having neither an oxidizing nor a reducing action; supplying to all or part of said mixture sufficient heat to start and maintain the reduction process and to melt, after said reduction has taken place, the resulting content of said furnace; removing the slag, ascertaining that neither the carbon nor the sulphur content of the molten bath exceeds 0.06%; forming a new slag by charging limestone ($CaCO_3$) and a small amount of ferriferous oxide; extracting a metal sample and checking whether it exhibits the prerequisite features; and tapping the iron if said prerequisite features have been attained, or continuing, if this is not the case, alternatingly to form and remove new slag and to check the features of samples until these correspond to said prerequisites, and then removing the slag and tapping the iron.

References Cited in the file of this patent
UNITED STATES PATENTS

| 95,358 | Breche-Vigor | Sept. 28, 1869 |
| 1,435,686 | Bassett | Nov. 14, 1922 |
| 2,476,453 | Pierce | July 19, 1949 |

OTHER REFERENCES

Physical Chemistry of Steel Making. The Control of Iron Oxide in the Basic Open Hearth Process. Co-Operative Bulletin 68, pages 63, 78 and 79. Published by the Mining and Metallurgical Advisory Boards, Pittsburgh, Pa., in 1935.

Ser. No. 377,754, Venzi et al. (A. P. C.), published May 4, 1943.